Aug. 20, 1963     D. GILETTA ETAL     3,101,289
METHOD OF MAKING EXPANSIBLE TUBULAR DIAPHRAGMS
FOR TIRE BUILDING DRUMS
Filed April 20. 1960     6 Sheets-Sheet 1

INVENTORS
Dario Giletta
& Antonio Pacciarini

BY Stevens, Davis, Miller & Mosher
ATTORNEYS

Aug. 20, 1963　　D. GILETTA ETAL　　3,101,289
METHOD OF MAKING EXPANSIBLE TUBULAR DIAPHRAGMS
FOR TIRE BUILDING DRUMS
Filed April 20, 1960　　6 Sheets-Sheet 2

INVENTORS
Dario Giletta
& Antonio Pacciarini
BY Stevens, Davis, Miller & Mosher
ATTORNEYS

INVENTORS
*Dario Giletta*
*& Antonio Pacciarini*

BY *Stevens, Davis, Miller & Mosher*
ATTORNEYS

Aug. 20, 1963   D. GILETTA ETAL   3,101,289
METHOD OF MAKING EXPANSIBLE TUBULAR DIAPHRAGMS
FOR TIRE BUILDING DRUMS
Filed April 20, 1960   6 Sheets-Sheet 5

INVENTORS
Dario Giletta
& Antonio Pacciarini

BY Stevens, Davis, Miller & Mosher
ATTORNEYS

United States Patent Office 3,101,289
Patented Aug. 20, 1963

3,101,289
METHOD OF MAKING EXPANSIBLE TUBULAR DIAPHRAGMS FOR TIRE BUILDING DRUMS
Dario Giletta and Antonio Pacciarini, Milan, Italy, assignors to Pirelli S.p.A., Milan, Italy
Filed Apr. 20, 1960, Ser. No. 23,482
Claims priority, application Italy Apr. 24, 1959
6 Claims. (Cl. 156—133)

The present invention relates, generally, to a tire building drum of the type which includes two rigid side walls having the shape of discs and a diaphragm of resilient material stretched between the two side walls. More particularly, the present invention relates to improved diaphragms for use in a tire building drum of the above type and to the method of making such diaphragms.

In an apparatus of the general type referred to above, the two side walls are assembled in spaced and parallel relation on the main shaft of the building machine. The main shaft is composed of two shaft portions telescopically slidable with respect to each other in such a manner that the side walls are movable towards or away from a reference plane which is located midway between, and parallel to, the side walls. In the periphery of each side wall there is a circular groove which encases an expansible ring (forming a bead seat) together with a corresponding inflatable air tube underlying the ring. The diaphragm is stretched between the two side walls so as to cover the peripheries thereof including the bead seats resulting from the expansible rings. The ends of the diaphragm which include suitable thickened edges are secured in air-tight relation in appropriate grooves adjacent the end faces of the two side walls.

For building up a tire on a drum of the above type, the first layers of plies for the carcass, which are of such a length as to extend laterally beyond the drum side walls, are wound about the diaphragm. The bead wires (for the bead reinforcement) are slipped over the plies and are centered above the midline of the grooves provided in the peripheries of the expansible rings. Compressed air is then introduced into the inflatable air tubes so as to push the rings radially outwardly against the diaphragm with the result that carcass plies are compressed between the bead wires and the ends of the diaphragm.

The space which is enclosed between the two side walls and the diaphragm is then placed in communication with a source of compressed air which expands the diaphragm in the region between the two bead wires. Moreover, since textile or metallic reinforcements are incorporated in the wall of the diaphragm, the latter expands to a predetermined shape, namely the shape of a cylinder whose diameter is greater than the outer diameter of the two bead wires, the conformation of this cylinder merging into the lesser diameter of the diaphragm at said bead wires through two rounded connections.

A principal object of the present invention is to provide, in a tire building drum of type referred to above, improved diaphragms in which are incorporated various types of reinforcements; as will appear hereinafter, these reinforcements will be incorporated in the diaphragm in such a manner that, when the diaphragm is expanded, it will assume the shape and characteristics necessary for building up the pneumatic tire.

A further object of the present invention is to provide various types of internal reinforcements for the improved diaphragm referred to above so that the latter will be able to achieve the two above-mentioned limiting shapes.

A still further object of the present invention is to provide a novel process for constructing the improved diaphragm referred to above.

Other and further objects and advantageous features of the present invention will hereinafter more fully appear in connection with a detailed description of the drawings in which.

Figure 1:
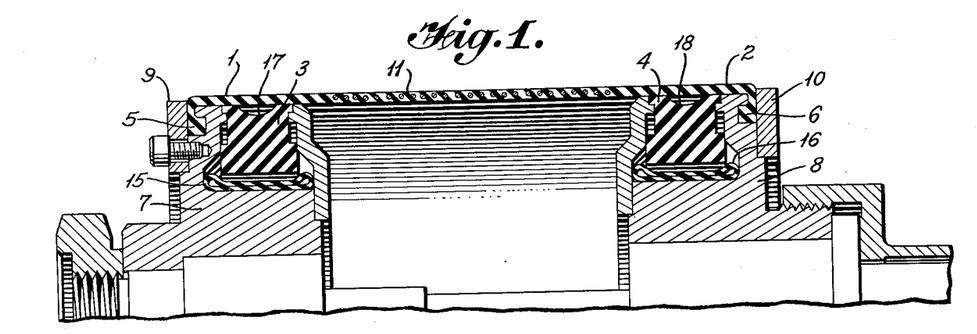
FIGURE 1 represents a longitudinal section of the upper half of a tire building drum at the beginning of its operation, when the space enclosed between the side walls and the diaphragm of the present invention is under atmospheric pressure.
Figure 2:
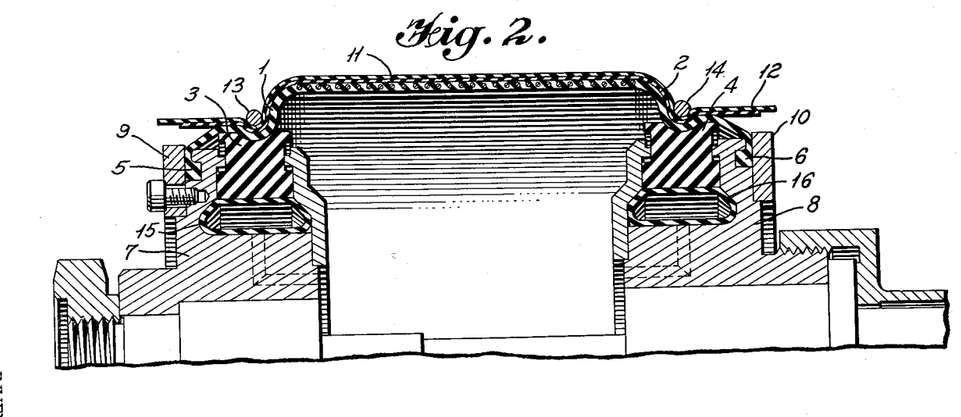
FIGURE 2 represents a partial longitudinal section of the tire building drum shown in FIGURE 1 at a subsequent stage of operation; i.e. after the plies and bead wires have been put in place and after the enclosed space has been placed under sufficient pressure to expand the diaphragm to its outer limiting shape.

With reference to FIGURE 1, in which the reinforced diaphragm is represented in cylindrical condition, and to FIGURE 2 in which the diaphragm is represented in expanded condition, the diaphragm can be considered divided, in the longitudinal direction, into three zones having different characteristics; that is two lateral zones, indicated in FIGURE 1 with the reference numerals 1 and 2, which cover the expansible rings 3 and 4 which terminate with thickened edges 5 and 6 anchored to the two side walls 7 and 8 by means of the rings 9 and 10. A central zone 11 is provided which corresponds to the middle portion of the drum.

When the diaphragm is in the rest position, namely when the space in the drum is at atmospheric pressure as represented in FIGURE 1, both the two lateral zones and the central zone must have a diameter equal to or smaller than that of the two side walls and smaller than the inner diameter of the bead wires which are to be fitted on the side walls.

After the carcass plies, indicated as 12 in FIGURE 2, have been wound about the drum, and after the bead wires 13 and 14 have been placed in position, compressed air is introduced into the two air tubes 15 and 16 so that the rings 3 and 4 are expanded until the plies are brought in contact with the bead wires 13 and 14. In this way the two lateral zones 1 and 2 of the reinforced diaphragm and the plies 12 of the tire being built up are kept tight between the grooves 17 and 18 on the periphery of the two rings 3 and 4 and the bead wires 13 and 14.

Now compressed air is introduced between the two side walls 7 and 8, while these side walls are moved towards each other at the same time, the reinforced diaphragm thus assuming the shape schematically represented in FIGURE 2. Therefore, the central zone 11 will take a cylindrical form of predetermined diameter, in any case greater than the outer diameter of the two bead wires 13 and 14, and the lateral zones 1 and 2 will constitute two connections tangent outwardly to the two bead wires 13 and 14 and inwardly to the cylindrical zone 11.

During the tire building operation, the plies wound on the drum must be stitched so as to make them well adherent to one another; this step is carried out by means of two rollers 20 and 21 (FIGURE 3) which are pressed firmly against the plies and which are moved, while the drum rotates, from the midline to the two ends of the cylindrical central zone 11. Under the pressure of these rollers, the expanded diaphragm must not loosen or displace eccentrically with respect to the axis of rotation of the drum, that is, it must have good radial stability.

Figure 3:
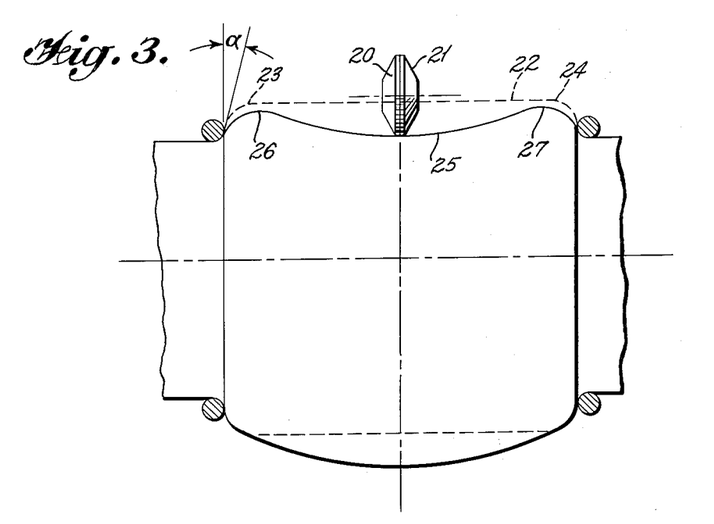
FIGURE 3 is a schematic longitudinal section of a diaphragm during the stitching operation; the solid line position represents a diaphragm devoid of longitudinal reinforcements whereas the dotted line position represents a corresponding condition for a diaphragm which is properly provided with longitudinal reinforcements.

As it may be seen from FIGURE 3, in order to move eccentrically with respect to the axis of rotation under the action of the two rollers 20 and 21, the diaphragm should be able to extend longitudinally, because the length of the dotted line 22, which represents a straight line segment connecting between the two outermost points 23 and 24 of the cylindrical zone, is shorter than the curvilinear segment 25 connecting the two points 26 and 27; the latter two points would result from a loosening of the two connections at the ends of the cylindrical zone and the two bead wires 13 and 14.

The diaphragm stretched between the two drum side walls therefore must be reinforced in two ways: (1) with a binding along planes normal to the axis of rotation of the drum, limited to the central zone so that this zone may maintain a cylindrical form under the action of the inner pressure, and (2) with a binding perpendicular to the first, extending along the whole length between the two bead wires 13 and 14, in order to give the diaphragm sufficient radial stability to withstand the action of the rollers for stitching the plies without displacing the diaphragm eccentrically.

However, the diaphragm could be displaced eccentrically not only by extending in the longitudinal direction, but also by any deformation originating in the end connections which would bring the two ends 23 and 24 to the points 26 and 27, respectively. Such a deformation is opposed by the air pressure acting inside the drum with a force corresponding in magnitude to the area of the rings comprised between the outermost points of the cylindrical region 23 and 24 and the bead wires 13 and 14 multiplied by the pressure acting inside the drum. This force is, of course, the higher the greater is the difference between the diameter of the expanded diaphragm and the diameter of the bead wires, and correspondingly, the greater is the angle α between the tangent to the connections and the tangent to the bead wires normal to the axis of rotation of the drum.

Practically, even if said angle α is equal to zero, it is easy to achieve a sufficient radial stability merely by means of the pressure exerted by the air on the rings corresponding to the two connections; therefore, in the following description, the deformation of these connections will no longer be considered as originating due to the instability of the expanded diaphragm.

The reinforcement of the central zone of the diaphragm along planes normal to the drum axis, can be carried out in two ways: (1) with an inextensible material or (2) with a material extensible up to a predetermined elongation.

If the reinforcement is inextensible, it will be made with a diameter corresponding to the maximum diameter which the diaphragm will assume when inflated with compressed air, namely as represented in FIGURE 2; such a diaphragm would be constructed on a drum of the type illustrated in FIGURE 12.

Instead, if the reinforcement is elastic, it will be made with a diameter corresponding to the minimum diameter the diaphragm will assume when not inflated with compressed air, namely as represented in FIGURE 1.

In both cases, however, the longitudinal reinforcement will be obtained from an inextensible material, disposed with its threads parallel to one another and to the axis of rotation of the drum. This reinforcement will always allow an elastic expansion of the diaphragm itself in a direction normal to the axis of rotation of the drum, as the material interposed between the threads is elastic, and therefore can be made with a diameter corresponding to the minimum diameter, namely the one represented in FIGURE 1.

Figure 4:
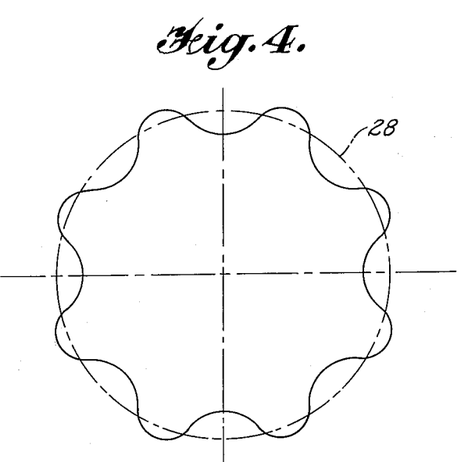
FIGURE 4 is a schematic cross section of a diaphragm of the type which is vulcanized at its maximum diameter when its inside is at atmospheric pressure, the dotted line representing a median circumference corresponding to the diameter of the side walls.

When the diaphragm is provided with inextensible reinforcements disposed along planes normal to the drum axis and, therefore, made at the predetermined maximum diameter for the expanded condition of the diaphragm, it becomes necessary, in order to reduce the outer diameter of the rinforced diaphragm so as to wind the carcass plies on the drum and to place the two bead wires in position, to move the two side walls 7 and 8 axially away from each other so as to subject the diaphragm to a longitudinal stretching. The reinforced central zone will tend in this way to form, in cross section, a series of undulations, as represented in FIGURE 4.

The development of these undulations will correspond to that of the periphery of the expanded diaphragm and the undulations will take place alternatively inside or outside a median circumference 28 whose diameter corresponds to the diameter of the side walls between which the diaphragm is stretched. The amplitude of the undulations depends, of course, not only on the stiffness of the reinforcement, but also on the tension exerted on the diaphragm by the two side walls, when these are moved apart relative to each other. In fact, the thread reinforcements disposed in the longitudinal direction tend to lie, when stretched, along a straight line segment between the two side walls. In the points where the undulations do not cross the circumference 28, the thread reinforcements instead must lie along a curved line, which is the more curved the more the undulations depart from the line 28. Under the opposing action of the longitudinal reinforcement, the undulations, which cannot reduce their development measured in the cross direction, will tend to increase in number, so reducing the distance of the various inflection points from the circumference 28.

On the other hand, when the reinforcement of the central zone of the diaphragm is of elastic material and, therefore made, with a diameter corresponding to the outer diameter of the side walls, the diaphragm in non-expanded condition will of course assume the smaller diameter, that is the most suitable upon which to wind the tire plies and to apply the two bead wires about them.

The elastic reinforcement must possess particular features, however, which are somewhat difficult to achieve in practice; namely, it must become inextensible when the diaphragm, in its central zone, assumes the desired maximum diameter.

In order to construct a diaphragm having an elastic reinforcement complying with the above requirements, various methods can be followed; that is:

(a) The reinforcement can be prepared by spirally winding, about the central zone of the diaphragm, a thread of elastic material covered with a braid of inelastic material. It is known that a covering of this kind limits the elongation of the elastic thread as the braid under elongation reduces in diameter and, when closely applied on the thread, does not allow a further elongation of the latter.

Figure 5:
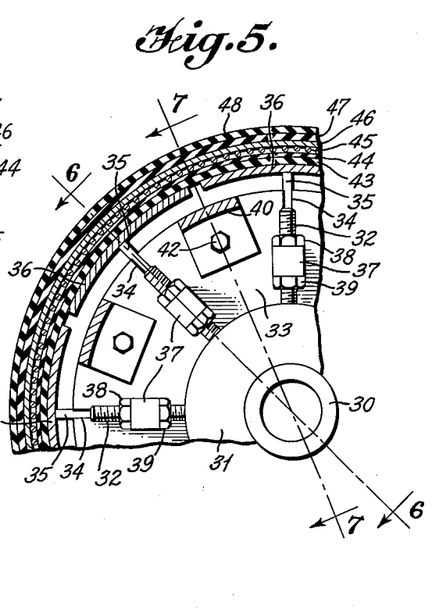
FIGURE 5 is a cross section of one quadrant of a drum designed for building up one form of diaphragm of the present invention.
Figure 6:
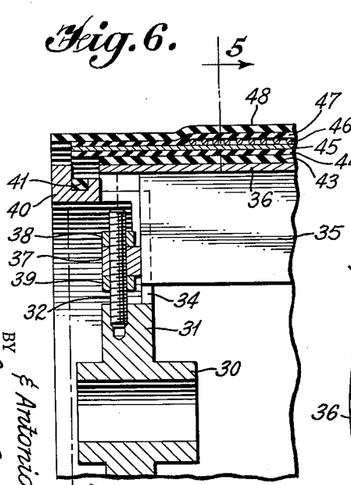
FIGURE 6 is a partial longitudinal section of the drum shown in FIGURE 5 taken along section line 6—6 of FIGURE 5.
Figure 7:
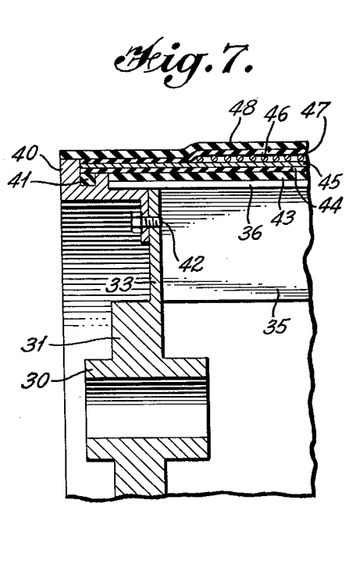
FIGURE 7 is a partial longitudinal section of the drum shown in FIGURE 5 taken along section line 7—7 of FIGURE 5.

A reinforcement of this type can be incorporated in the wall of the diaphragm by using a drum as represented on FIGURES 5, 6 and 7. This drum consists of two central hubs 30 carrying at their ends two spaced and equal flanges 31, symmetrical to the midline of the drum. FIGURES 5, 6 and 7 represent only one hub and one flange for the sake of simplicity. Each flange is provided with a plurality of screw studs 32 and a plurality of sectors 33 spaced from one another by radially disposed rectangular windows 34. This drum also includes a series of radially disposed sheets 35 carrying at their ends a series of circumferential tiles 36, the latter forming together the outer surface of the drum. At the two ends of the sheets 35 are fastened two hubs 37 which project through the windows 34 and which are driven along the screw 32, the hubs being held in place on the screws by means of two threaded nuts, a nut 38 over the hub, and a nut 39 below it. At the two sides of the side wall 33 there are two rings 40, each carrying on its outer face a slot 41 whose section corresponds to the section of the thickened edges 5 and 6 of the diaphragm (see FIGURE 1), which are anchored through the rings 9 and 10 to the side walls 7 and 8. The diameter of these slots corresponds to the diameter which the thickened edges 5 and 6 will assume when finished. The rings 40 are fastened by means of screws 42 (FIGURE 7) to the sectors 33 carried by the flanges 31.

To build up, on such a drum, the reinforced diaphragm of type (a), the following steps are carried out:

The outer surface of the drums is covered with a cylinder 43 of vulcanized elastic rubber of substantial thickness, and this cylinder, in turn, is covered with a first sheet 44 of uncured rubber. Then, by adjusting the threaded nuts 38 and 39, the hubs 37 are moved to such a position that the tiles connected to them bring the outer diameter of the rubber sheet 44 to the diameter which the reinforcing threads of the diaphragm will assume when the diaphragm is at its maximum expanded condition. Subsequently, a weftless fabric 45 made of parallel threads and rubberized on both faces, similar to that used in the tire manufacture, is wound on the rubber sheet 44.

The threads of this fabric will be disposed parallel to the drum axis and will constitute the longitudinal reinforcement. At the two sides the reinforcement must be sufficiently long to be kept between the grooves 17 and 18 and the bead wires 13 and 14, and, therefore, will extend as far as the reinforcing edges 5 and 6 (to be anchored between the side walls 7 and 8 and the rings 9 and 10). A cord 46, previously coated with a rubber layer in an extruding machine, is then spirally wound about the central portion of the fabric 45. This cord is composed of one or more extensible rubber threads covered with a braid of inextensible material and the unit, while being wound, is stretched under a load corresponding to the stress which will be imparted to the various cords of the diaphragm when the latter, expanded by virtue of the compressed air introduced between the two side walls, reaches its maximum diameter. The spirally wound cord layer is then covered with a second sheet 47 of uncured rubber, and the assembly is wrapped with an elastic sheath 48. Subsequently, the two hubs 30 are adjusted to reduce the diameter of the diaphragm to that which it will have after vulcanization. This diameter corresponds to the outer diameter of the rings 40. The diaphragm is afterwards completed with the rubber necessary to form the two thickened adges 5 and 6 by filling the slots 41 with rubber. Thereafter, the assembly is covered with an inextensible binding, applied on the outer surface of the sheath 48, and not represented in the figures. After vulcanization at this reduced diameter, the diaphragm can be removed from the drum on which it has been built up by introducing compressed air between the diaphragm and the cylinder of vulcanized rubber.

A diaphragm prepared in such a way will have all the required characteristics; thus, when assembled on the drum side walls, the diaphragm will tend to assume, in a non-expanded condition, the minimum diameter at which it was vulcanized.

When expanded, the central reinforced zone will increase in diameter only up to the maximum required diameter, because the elastic cord forming the central zone has been wound at a predetermined tension. Furthermore, the two lateral connections can also expand radially (and easily) by virtue of the rubber interposed between the inextensible threads forming the longitudinal reinforcement and, thus, will assume the desired rounded shape. At the same time, the inextensible longitudinal threads will ensure the longitudinal stability of the diaphragm.

(b) A reinforced diaphragm of a similar type can also be constructed according to a method substantially the same as the above described one, but using a cord of inextensible yarn in lieu of a cord of extensible threads covered with an inextensible braid.

This cord is preferably composed of a number of twisted yarns of small diameter twisted on each other a preferably small pitch.

As in the case of the elastic cord, this cord will be wound on the building drum under a tension corresponding to that to be imparted to it by the diaphragm when the latter is expanded to its maximum diameter (by virtue of the compressed air introduced between the two side walls of the building drum) and, according to the previously described process, after having been sheathed, the diaphragm will be brought to the minimum diameter and then vulcanized.

In this case the cord replaces the inextensible braid which, in the preceding case, covered the elastic threads; the elastic threads are, in turn, replaced by the extruded rubber covering and by the rubber sheet 44 and 47 which complete the diaphragm.

Figure 8:
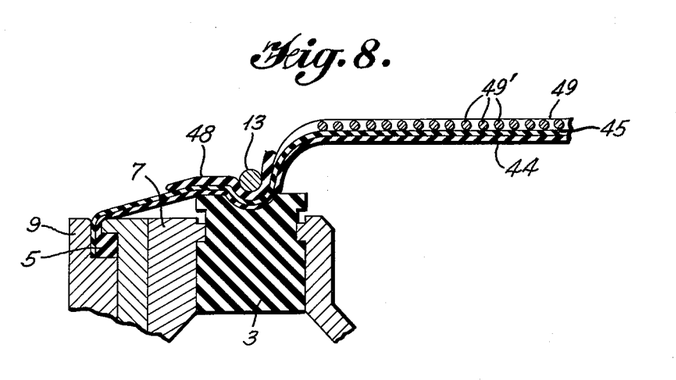
FIGURE 8 is a partial longitudinal section of a side wall of a tire building drum in expanded condition provided with a modified diaphragm.
Figure 9:
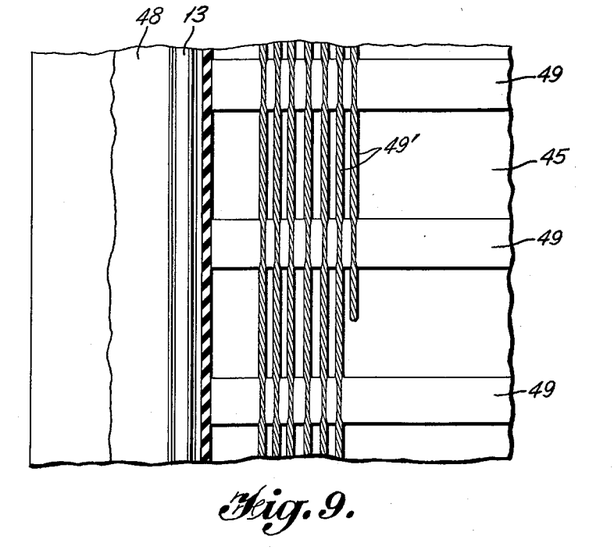
FIGURE 9 is a fragmentary horizontal section of the modified diaphragm shown in FIGURE 8.

(c) FIGURES 8 and 9 represent a diaphragm reinforced with a cord 48 spirally wound on its central zone and held in place on the diaphragm by a plurality of longitudinal strips 49 disposed parallel to the axis of rotation of the drum.

The process for building up a diaphragm having a reinforcement of this kind is as follows:

As in the case of diaphragm (a), the cylinder 43 of vulcanized rubber and the sheet 44 of uncured rubber are assembled on the drum represented in FIGURES 5, 6 and 7. The tiles 36 are then expanded, by adjusting the nuts 38 and 39, to reach a diameter corresponding to that of the maximum expansion of the diaphragm. The rubberized weftless fabric 45 having parallel threads is applied on the drum with the threads disposed in longitudinal direction. A number of strips of uncured rubber 49, disposed parallel to the axis of rotation and having a length equal to or greater than that to be assumed by the reinforced central zone, are then applied on the rubberized fabric 45. Over these strips 49, an inextensible cord 49', which will form the reinforcing band, is spirally wound under a tension corresponding to that to be imparted to it by the diaphragm when the latter is expanded.

The spiral winding 49' is subsequently stitched so as to be incorporated in the underlying strips 49 of uncured rubber. Finally, the diaphragm is covered with the elastic sheath 48, the tiles are brought again to the minimum diameter of the diaphragm, the strong binding is applied to the whole, and then the diaphragm is vulcanized.

In this case, the diaphragm will also have all the required features; that is, when in the non-expanded condition, the diaphragm will tend to assume the minimum diameter, namely the vulcanization diameter. On the contrary, when expanded, it shall be abue to expand only to the maximum diameter allowed by the layer of cords which cover its central zone and which were previously placed under tension as described above. With a reinforcement of this kind, the cords 49' will allow the diaphragm to shrink, as they are able to fold freely upon themselves in the spaces located between the strips 49. Of course, it is necessary to interpose between the cords 49' and the underlying longitudinal reinforcement 45, in those portions not occupied by the longitudinal strips, an anti-adhesive agent in order to prevent the bond of these two parts which are pressed against each other by the binding during vulcanization.

A reinforcement of this kind can also be prepared and vulcanized separately from the diaphragm and then fastened to it by means of a bonding agent applied on the cross reinforcing strips which keep the cords together. In this case the cords are separately wound and vulcanized on a drum having a diameter corresponding to the diameter of the diaphragm in the expanded condition.

Figure 10:
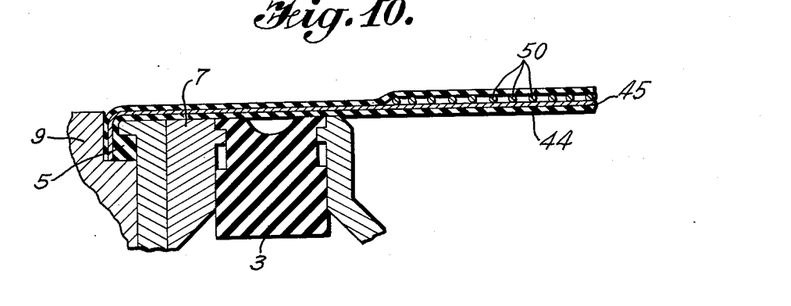
FIGURE 10 is a partial longitudinal section of a sidewall of a tire building drum in non-expanded condition provided with another modification of the diaphragm of the present invention.
Figure 11:
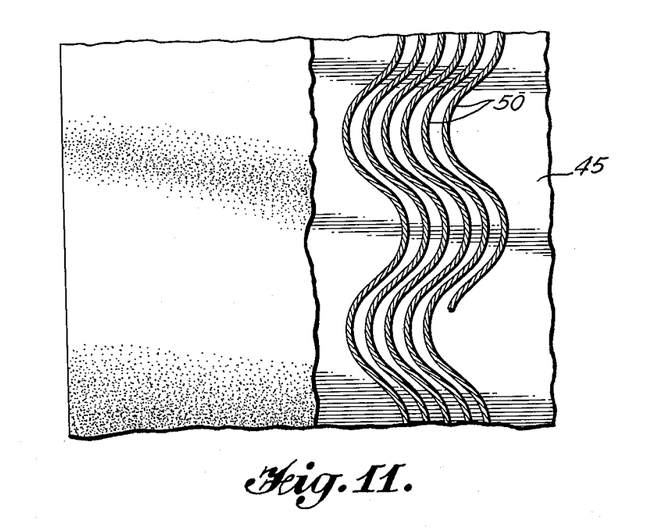
FIGURE 11 is a fragmentary horizontal section of the modified diaphragm shown in FIGURE 10.

(d) FIGURES 10 and 11 represent a reinforced diaphragm made up with an inextensible cord 50, wound along a zig-zag path about the central zone shrunk to its minimum diameter. To build up a diaphragm having a reinforcing band of such type, the following steps are carried out:

As said above, the drum is covered with a cylinder 43 of vulcanized rubber of substantial thickness, and a sheet 44 of uncured rubber is wound on said cylinder; while maintaining the drum diameter at its minimum value, a layer of rubberized weftless fabric 45 with parallel threads is applied on the unit with the threads disposed in the longitudinal direction. A second sheet of uncured rubber is placed on the rubberized fabric 45 and onto the sheet an inextensible spirally wound cord 50 is disposed, whose turns are not stretched but loose to form undulations. The undulation of each turn must of course correspond, as to pitch, with the undulation of the adjacent turn and the amplitude of the undulation must be so calculated that when the diaphragm is expanded to its maximum diameter, the single turns become rectilinear. A further sheet of uncured rubber is placed on the reinforcing layer and, after having stitched the outer surface of the diaphragm in order to incorporate the cord in its two adjacent rubber layers, the assembly is sheathed and vulcanized. In this case it is no longer necessary to build up the diaphragm on the drum having a diameter corresponding to that of the non-expanded diaphragm before the vulcanizing operation. Therefore, the employment of an elastic sheath is also unnecessary.

In fact the expansion of the reinforced diaphragm is ensured by the elongation of the reinforcing cord wound along a zig-zag path and the contraction of the diaphragm is ensured by the elasticity of the rubber in which the reinforcing cord is incorporated. This type of reinforcement will also have the required characteristics necessary to limit the expansion of the diaphragm when the inextensible reinforcing cords have become rectilinear.

All the above described reinforcements are elastic reinforcements wherein the expansion of the central zone of the diaphragm is limited when the enclosed space is placed in communication with a source of compressed air, and wherein the diaphragm is again brought to its initial tubular form, whose diameter is not greater than the diameter of the two side walls, when the enclosed space is placed in communication with the atmosphere.

(e) In the foregoing description mention is also made of another type of diaphragm reinforced in its central zone with inextensible threads, which is built up and vulcanized at a diameter corresponding to the diameter of maximum expansion. As previously stated, this diaphragm can be brought to a diameter smaller than the outer diameter of the side walls of the building drum (so as to apply the bead wires in the grooves of the expansible rings) merely by moving the two side walls away from each other in the longitudinal or axial direction when the space enclosed by the diaphragm is under atmospheric pressure, thus subjecting the longitudinal reinforcements to a stretching action and reaching the condition shown in FIGURE 4.

Figure 12:
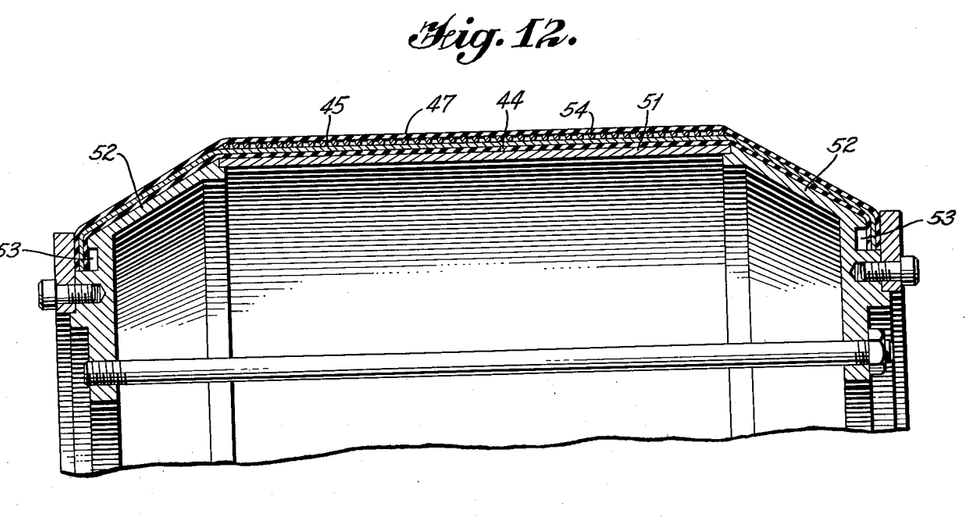
FIGURE 12 is a cross section of a drum designed for building up another form of diaphragm of the present invention.

As shown in FIGURE 12, a diaphragm of this kind can be built up on a cylindrical drum 51, having at its ends two conical projections 52 in which are provided slots 53 necessary for molding the thickened edges of the diaphragm. The diameter of these slots obviously corresponds to the diameter which the two thickened edges must have to be seated into the grooves which fasten the diaphragm to the side walls. Onto this drum 51 there are wound: a sheet 44 of uncured rubber, a layer of rubberized weftless fabric 45 made of parallel threads with said threads disposed in longitudinal direction, and the inextensible cord 54 of the circumferential reinforcement spirally wound on the central zone of the diaphragm. The slots 53 are filled with sufficient rubber to form the thickened edges of the diaphragm. The assembly is then covered with a second sheet 47 of uncured rubber and then vulcanized under binding.

Whereas the present invention has been described with particular regard to the illustrations in the drawings, it should be evident that other and further embodiments and modifications, apart from those shown or suggested herein, might be made within the spirit and scope of this invention.

What is claimed is:

1. A process for building up a tubular diaphragm which is elastically expansible in the radial direction from a predetermined minimum diameter to a predetermined maximum diameter which comprises disposing a first sheet of uncured rubber about a cylindrical body having a diameter not greater than said minimum diameter, increasing the diameter of the cylindrical body to said maximum diameter, winding about said first sheet of uncured rubber a sheet of a rubberized weftless fabric whose threads are inextensible and parallel to one another and to the axis of the cylindrical body, spirally winding about the central zone of said fabric a cord formed of one or more extensible rubber threads covered with a braid of inextensible material, subjecting said cord to a tension stress corresponding to the stress which will be imparted to it whenever the diaphragm is brought to its maximum diameter, applying over said cord a second sheet of uncured rubber and then an elastic sheath, bringing the cylindrical body to its original diameter, and vulcanizing the assembly.

2. A process for building up a tubular diaphragm which is elastically expansible in the radial direction from a predetermined minimum diameter to a predetermined maximum diameter, which comprises disposing a first sheet of uncured rubber about a cylindrical body having a diameter not greater than the said minimum diameter, increasing the diameter of the cylindrical body to said maximum diameter, winding about said first sheet of uncured rubber a sheet of a rubberized weftless fabric whose threads are inextensible and parallel to one another and to the axis of the cylindrical body, spirally winding about the central zone of said fabric a cord composed of a plurality of inextensible yarns of small diameter twisted about one another at a small pitch, subjecting said cord to a tension stress corresponding to the stress which will be imparted to it whenever the diaphragm is brought to its maximum diameter, applying over said cord a second sheet of uncured rubber and then an elastic sheath, bringing the cylindrical body to its original diameter, and vulcanizing the assembly.

3. A process for building up a tubular diaphragm which is elastically expansible in the radial direction from a predetermined minimum diameter to a predetermined maximum diameter, which comprises disposing a first sheet of uncured rubber about a cylindrical body having a diameter not greater than said minimum diameter, increasing the diameter of the cylindrical body to said maximum diameter, winding about said first sheet of uncured rubber a rubberized weftless fabric whose threads are inextensible and parallel to one another and to the axis of the cylindrical body, applying strips of uncured rubber longitudinally at equal intervals along the circumference of said fabric, spirally winding about the central portion of the assembly a cord of inextensible yarn while subjecting said cord to a tension stress corresponding to the stress which will be imparted to it whenever the diaphragm is brought to its maximum diameter, stitching the portion covered by the cord to incorporate it in the underlying strips, placing an elastic sheath about the assembly, bringing the cylindrical body to its original diameter, and vulcanizing the assembly.

4. A process for building up a tubular diaphragm which is elastically expansible in the radial direction from a predetermined minimum diameter to a predetermined maximum diameter which comprises disposing a first sheet of uncured rubber about a cylindrical body having a diameter not greater than said minimum diameter, winding about said first sheet of uncured rubber a rubberized weftless fabric whose threads are inextensible and parallel to one another and to the axis of the cylindrical body, applying over said fabric a second sheet of uncured rubber, spirally winding about the central portion of the second sheet an inextensible cord along undulations parallel to one another and of constant pitch so that the development of each turn may correspond to the development of a circumference having a diameter equal to said maximum diameter for the cord layer when the diaphragm reaches its maximum diameter after expansion, applying a further sheet of uncured rubber, stitching the assembly to incorporate the cord in the two adjacent rubber sheets, placing an elastic sheath about the assembly, and vulcanizing the assembly.

5. A process for building up a tubular diaphragm as set forth in claim 1 and wherein said cylindrical body is provided with two annular grooves located adjacent the side ends of said cylindrical body, including the additional step of filling said annular grooves with uncured rubber prior to vulcanizing, whereby the uncured rubber, after vulcanizing becomes fastened to the edges of the assembly to obtain two thickened portions along said edges.

6. A process for building up a tubular diaphragm which is expansible in the radial direction from a predetermined minimum diameter to a predetermined maximum diameter, which comprises disposing a first sheet of uncured rubber about a substantially cylindrical body having a diameter in its central portion corresponding to the maximum inner diameter of the expanded diaphragm and having outwardly convex frusto-conical ends whose minimum diameter corresponds to that of the ends of the diaphragm, said frusto-conical ends having therein two circumferential grooves, winding about said first sheet of uncured rubber a rubberized weftless fabric whose threads are inextensible and parallel to one another and to the axis of the cylindrical body spirally winding an inextensible cord about the central zone of the fabric, applying over said cord a second sheet of uncured rubber, filling said two circumferential grooves with uncured rubber and sheathing and vulcanizing the assembly.

References Cited in the file of this patent

UNITED STATES PATENTS

| | | |
|---|---|---|
| 2,084,009 | Sohl | June 15, 1937 |
| 2,871,912 | Kraft | Feb. 3, 1959 |
| 2,986,196 | Frazier | May 30, 1961 |

FOREIGN PATENTS

| | | |
|---|---|---|
| 463,422 | Canada | Feb. 28, 1950 |
| 1,221,091 | France | Jan. 11, 1960 |